(12) United States Patent
Chamberlain

(10) Patent No.: US 10,184,731 B2
(45) Date of Patent: Jan. 22, 2019

(54) DOMESTIC BOILER PREHEATER

(71) Applicant: Luke Chamberlain, Ringwood (GB)

(72) Inventor: Luke Chamberlain, Ringwood (GB)

( * ) Notice: Subject to any disclaimer, the term of this patent is extended or adjusted under 35 U.S.C. 154(b) by 0 days.

(21) Appl. No.: 14/420,285

(22) PCT Filed: Aug. 7, 2013

(86) PCT No.: PCT/GB2013/052111
§ 371 (c)(1),
(2) Date: Feb. 6, 2015

(87) PCT Pub. No.: WO2014/023959
PCT Pub. Date: Feb. 13, 2014

(65) Prior Publication Data
US 2015/0198384 A1    Jul. 16, 2015

(30) Foreign Application Priority Data
Aug. 7, 2012  (GB) .................................. 1214131.3

(51) Int. Cl.
*F28D 21/00* (2006.01)
*F24H 8/00* (2006.01)
(Continued)

(52) U.S. Cl.
CPC ......... *F28D 21/0007* (2013.01); *F24D 12/00* (2013.01); *F24H 8/00* (2013.01);
(Continued)

(58) Field of Classification Search
CPC .......... F24H 8/00; F24H 9/0084; F24D 12/00; F23D 21/0007
(Continued)

(56) References Cited

U.S. PATENT DOCUMENTS

| 4,177,858 A | 12/1979 | Daman et al. |
| 4,246,887 A | 1/1981 | Christiansen |
| 4,303,122 A * | 12/1981 | Powell ................ F28D 15/0275 165/104.14 |

(Continued)

FOREIGN PATENT DOCUMENTS

| DE | 19714760 A1 | 10/1998 |
| FR | 2495754 A1 | 6/1982 |

(Continued)

*Primary Examiner* — Avinash Savani
*Assistant Examiner* — Aaron Heyamoto
(74) *Attorney, Agent, or Firm* — Rahman LLC

(57) ABSTRACT

A domestic boiler preheater includes a flue box having a combustion gas inlet to receive hot combustion gas from a boiler, and a combustion air inlet to receive air for combustion in a boiler. The preheater further includes a condenser having a mains cold water inlet and a mains water outlet arranged such that mains water flows through the condenser prior to being supplied to a boiler combustion chamber. The condenser further includes a central heating water return and a central heating water flow outlet arranged such that central heating water flows through the condenser prior to being supplied to the boiler combustion chamber. The condenser further includes connections that enable the condenser to be connected to preheated fluid supply pipework from a source of preheated fluid, the preheated fluid having fluid heated by heat from at least one of the combustion gas and a renewable energy source.

11 Claims, 3 Drawing Sheets

(51) Int. Cl.
*F24H 9/00* (2006.01)
*F24D 12/00* (2006.01)
*F28D 15/02* (2006.01)
*F28D 7/00* (2006.01)
*F28D 7/02* (2006.01)
*F28D 7/10* (2006.01)

(52) U.S. Cl.
CPC ......... *F24H 9/0084* (2013.01); *F28D 7/0083* (2013.01); *F28D 7/0091* (2013.01); *F28D 7/02* (2013.01); *F28D 7/106* (2013.01); *F28D 15/02* (2013.01); *F28D 15/0275* (2013.01); *F28D 21/0008* (2013.01); *F24D 2200/18* (2013.01); *F24D 2220/07* (2013.01); *Y02B 30/102* (2013.01)

(58) Field of Classification Search
USPC ...................................... 126/117; 165/104.21
See application file for complete search history.

(56) References Cited

U.S. PATENT DOCUMENTS 5,636,786 A * 6/1997 Daneshvar .............. F24H 3/087
  126/110 C
2009/0166018 A1 * 7/2009 Lundgreen ............ F28F 13/187
  165/173

FOREIGN PATENT DOCUMENTS

FR          2672113 A1      7/1992
WO  PCTGB2013052111       8/2013

* cited by examiner

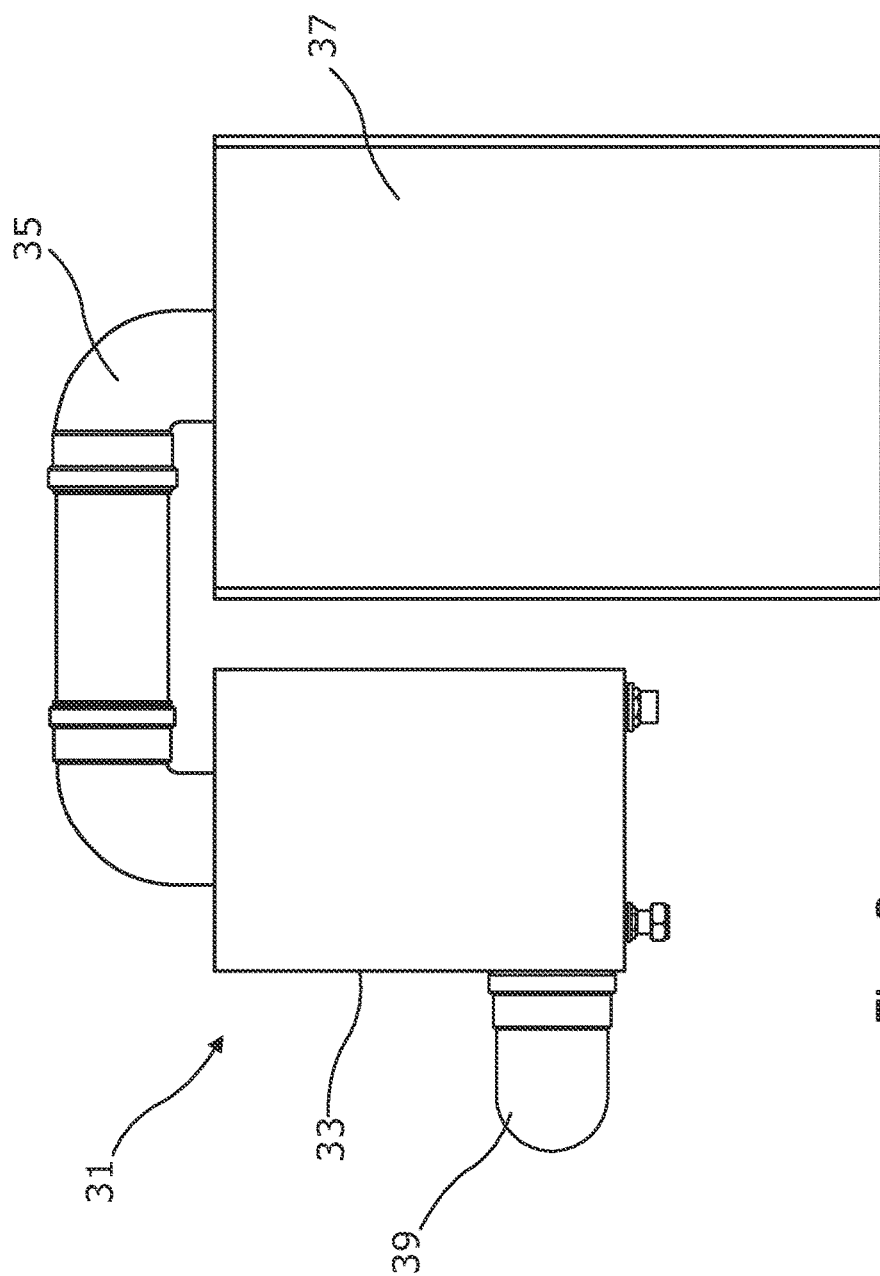

DOMESTIC BOILER PREHEATER

The present invention relates to a domestic boiler preheater for a domestic boiler used in buildings to heat water for central heating and/or a hot water supply.

It is desirable to be able to make the transfer of heat from the combustion process in a domestic boiler more efficient, in order to reduce the amount of fuel used to achieve the desired heating of the supply water. This applies both to the central heating supply water, and to the hot water supply.

The present invention stems from some work conducted in order to improve the efficiency of domestic boilers.

According to a first aspect of the invention there is provided a domestic boiler preheater comprising a flue box comprising a combustion gas inlet to receive hot combustion gas from a boiler, and a combustion air inlet to receive air for combustion in a boiler, the preheater further comprising a condenser comprising a mains cold water inlet and a mains water outlet arranged such that mains water flows through the condenser prior to being supplied to a boiler combustion chamber, the condenser further comprising a central heating water return and a central heating water flow outlet arranged such that central heating water flows through the condenser prior to being supplied to the boiler combustion chamber, the condenser further comprising connections that enable the condenser to be connected to preheated fluid supply pipework from a source of preheated fluid, the preheated fluid comprising fluid heated by heat from at least one of the combustion gas and a renewable energy source, the condenser being operative to transfer heat from the preheated fluid to at least one of the mains cold water from the mains cold water inlet, or the central heating water from the central heating water return, in order to preheat the mains or central heating water prior to entering the combustion chamber of the boiler.

Preferably a combustion gas heat exchanger is provided, operative to transfer heat from the combustion gas flowing through the combustion gas inlet to the combustion air flowing through the combustion air inlet such that the combustion air is preheated prior to entering the boiler.

Preferably the combustion gas heat exchanger is operative to heat the preheated fluid prior to the preheated fluid entering the condenser.

The combustion gas heat exchanger may comprise part of the flue box, or may comprise part of a separate flue pipe.

Preferably the combustion gas heat exchanger comprises at least one heat rod filled with a fluid, heat being transferred from the combustion gas into the fluid to vaporize the fluid, heat being transferred from the vaporized fluid to the inlet combustion air by subsequently condensing the fluid.

Where the combustion gas heat exchanger is provided at the flue box, preferably an array of parallel heat rods are provided.

Where the combustion gas heat exchanger is provided in the separate flue pipe, preferably an array of heat rods are provided, spaced along the longitudinal axis of the flue pipe.

The heat rods may comprise substantially solid metal rods, such as copper rods, whereby heat is conducted by the rods.

Preferably the condenser comprises an array of tubes some of which are connected between the mains cold water inlet and the mains water outlet so that mains water passes along the tubes, and some of which are connected between the central heating water return and the central heating water flow outlet so that central heating water passes along the tubes, the condenser further comprising a heat exchange coil arranged with the tubes to transfer heat from the preheated fluid to the water in the tubes.

The renewable energy source may directly heat the preheated fluid and thus may comprise a water heating solar panel, or a ground source heat pump for example.

According to a second aspect of the invention there is provided a domestic boiler comprising a boiler preheater according to the first aspect of the invention.

According to a third aspect of the invention there is provided a domestic boiler flue assembly comprising a boiler preheater according to the first aspect of the invention.

Other aspects of the present invention may include any combination of the features or limitations referred to herein.

The present invention may be carried into practice in various ways, but embodiments will now be described by way of example only with reference to the accompanying drawings in which:

FIG. 3 is a view from the side of another domestic boiler preheater in accordance with the present invention;

Figure 1:
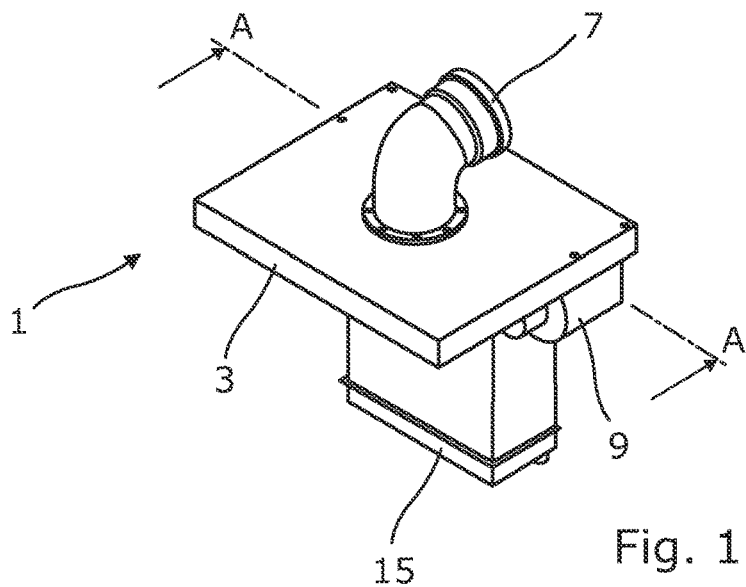
FIG. 1 is a perspective view of a domestic boiler preheater in accordance with the present invention.
Figure 2:
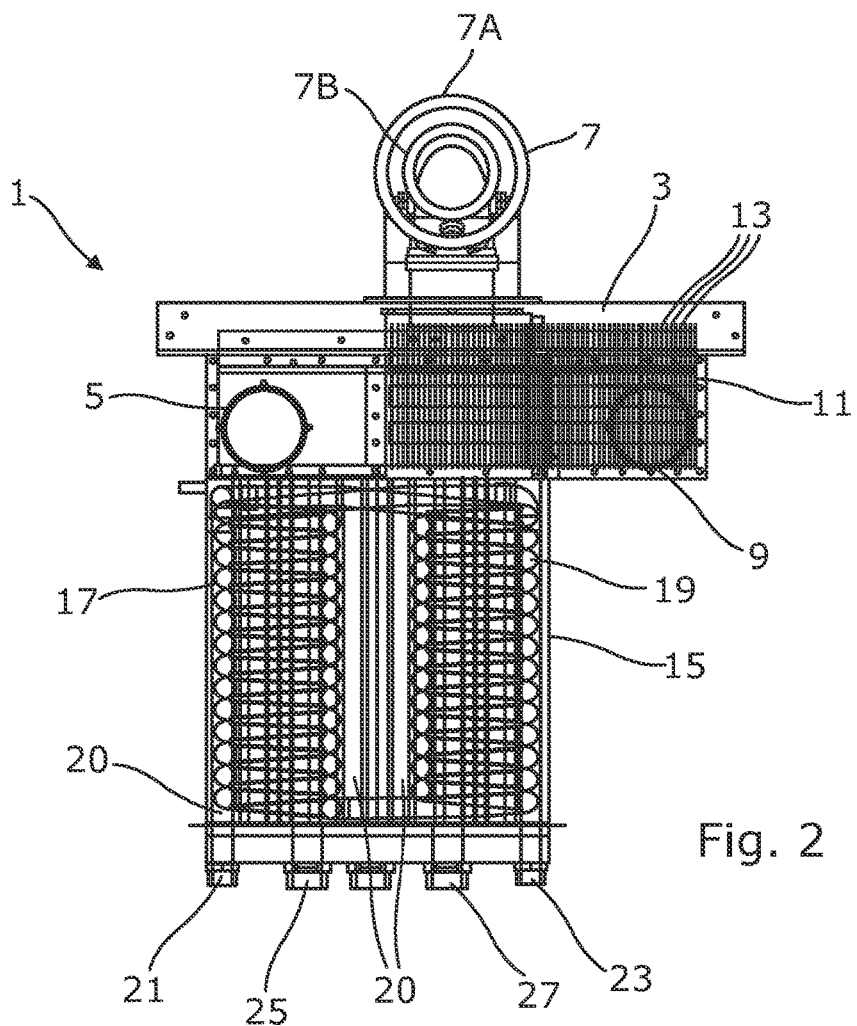
FIG. 2 is a sectional view through line A-A of the preheater of FIG. 1.

Referring initially to FIGS. 1 and 2, a domestic boiler preheater 1 is a self contained unit that is arranged, in this example, to be mounted within and comprise part of a domestic boiler (not shown).

The preheater 1 comprises an upper flue box 3 which is substantially hollow and provided with an internal combustion gas outlet passageway and an internal inlet air passageway. The combustion gas outlet passageway extends between a combustion gas inlet 5 which receives combustion gas from the boiler in use, and a flue outlet/inlet 7 which in this example comprises a standard 90° flue elbow projecting from the top of the flue box 3. The inlet air passageway extends between the flue outlet/inlet 5 and a combustion air outlet 9 which supplies combustion air to the boiler combustion chamber in use. The flue box 3 thus diverts and separates the combustion gases and inlet air and enables standard flue components to be connected to the flue inlet/outlet 7.

The flue outlet/inlet 7 in this example is a twin walled concentric flue wherein the hot combustion gas passes through an inner flue 7A in one direction whilst the cold inlet air passes in an opposite direction through an outer flue 7B. Thus some of the heat in the combustion gas is transferred through the wall of the inner flue 7A to the colder inlet air being drawn through the outer flue 7B.

A combustion gas heat exchanger 11 is provided in the form of an array of elongate heat rods 13 arranged in the path of the hot combustion gas from the boiler. In this example, the heat exchanger 11 is provided at the flue box 3, but it could alternatively be provided within the boiler combustion chamber for example. The heat exchanger 11 transfers heat from the combustion gas to a fluid within the heat rods 13, the fluid vaporizes as it absorbs heat from the combustion gas and then condenses to transfer the absorbed heat to the inlet combustion air.

So in this example, some of the heat from the combustion gas is passed directly into the colder combustion inlet air via the flue itself, whilst some of the heat from the combustion gas is passed into the colder combustion air via an intermediary fluid in the heat rods 13.

The preheater 1 further comprises a condenser 15 mounted below the flue box 3. The condenser 15 comprises two primary heat exchange coils 17, 19 which extend around an array of parallel water carrying tubes 20 within the condenser. Some of the water carrying tubes 20 extend between a mains cold water inlet 21, and a mains cold water outlet 23, whilst some extend between a central heating water return inlet 25 and a central heating water flow outlet 27. Thus mains water flows through some of the tubes 20, and central heating water flows through other of the tubes 20, in use.

The primary heat exchange coils 17, 19 carry a preheated fluid which transfers heat from the preheated fluid to the mains/central heating water in the tubes 20. This serves to preheat the mains/central heating water prior to entering the combustion chamber of the boiler. The boiler thus has to use less fuel, or even zero fuel, to transfer the necessary heat to the mains and central heating water.

The preheated fluid carried by the coils 17, 19 may be preheated by any suitable heat source. Once example of such a heat source is the heat in the combustion gas, and this may be transferred into the preheated fluid via the combustion gas heat exchanger 11 as described above.

The preheated fluid may be preheated via a renewable energy source. In one example, the preheated fluid may be provided directly from a water heating solar panel, or a ground source heat pump. Preheated fluid may be provided indirectly via an electric water heater powered by electricity from a renewable electricity supply such as photovoltaic panels, or a wind powered generator for example.

A combination of sources may be used to preheat the preheated fluid. For example, the fluid may first be heated via a solar panel, and subsequently further heated by the combustion gas heat exchanger 11.

The preheater 1 is arranged to be an integral part of a new boiler, and may be contained within the boiler housing.

A suitable controller may be provided to control the flow of water and/or preheated fluid through the preheater, and to control the activation of the combustion chamber accordingly. If sufficient heat is contained in the preheated fluid, that may be sufficient to provide the necessary heat to the water, and in that instance the controller would be operative not to activate the combustion chamber.

Referring additionally to FIG. 3, another preheater 31 comprises similar features to the preheater 1, like features being given like references.

Preheater 31 is arranged to be retrofitted in a flue of an existing boiler, that is, it is arranged such that it can be fitted to a boiler flue without requiring the boiler to be replaced. It may therefore be used to increase the efficiency of an existing boiler.

In this example, the components of the preheater 31 are provided in a standalone housing 33 which is connected in the flue between the flue outlet 35 of the boiler 37, and a standard flue pipe outlet 39 which exits the building. The standalone housing 33 may be arranged to be wall or floor mounted, or may be adapted to be mounted directly on the boiler 37 itself. The preheater 31 comprises the same mains water inlet and outlet, and central heating water flow and returns, as preheater 1, and the internal flue box, combustion gas heat exchanger, and primary coils are also similar.

Figure 6:
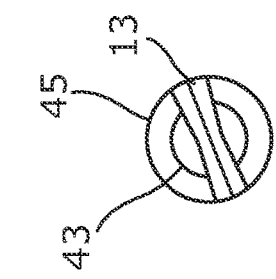
FIG. 6 is an end view of the flue pipe of FIGS. 4 and 5.
Figure 4:
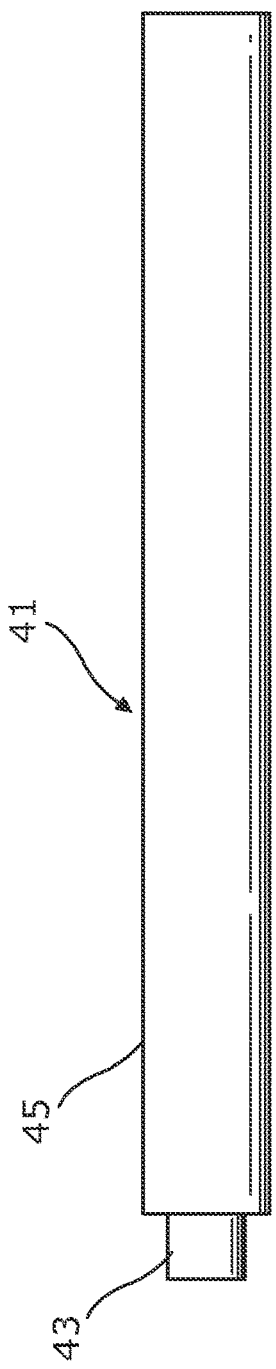
FIG. 4 is a side view of a flue pipe for a domestic boiler preheater in accordance with the present invention.
Figure 5:
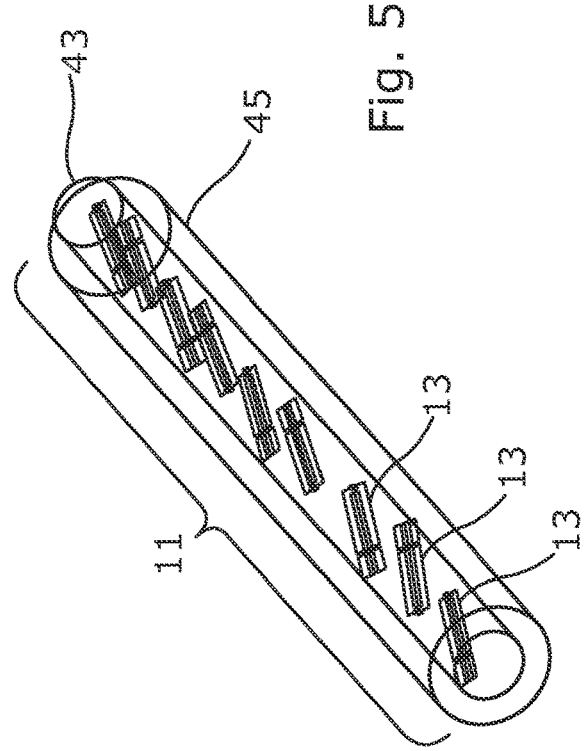
FIG. 5 is a perspective sectional view of the flue pipe of FIG. 4.

Referring additionally to FIGS. 4 to 6, a domestic boiler flue pipe 41 is of the concentric twin walled type with combustion gas flowing in one direction through inner flue pipe 43, and colder inlet combustion air flowing in the other direction through outer flue pipe 45. In this example, the array of elongate heat rods 13 of the combustion gas heat exchanger 11 is provided in flue pipe 41 itself. Thus a plurality of heat rods 13 are spaced along the longitudinal axis of the flue pipe 41, each heat rod 13 extending transversely across the flue pipe 41 from the inner pipe 43 into the outer pipe 45. Heat is transferred from the hot combustion gas in the inner pipe 43, to the colder inlet combustion air in the outer pipe 45 by virtue of the fluid within each heat rod 13 vaporizing and subsequently condensing as described above.

The flue pipe 41 thus comprises its own combustion gas heat exchanger 11 which may be used as an alternative, or in addition, to the combustion gas heat exchanger 11 provided on the flue box 3 of the preheater 1, 31.

The flue pipe 41 has been illustrated as a straight pipe, but any other shape or configuration of flue pipe is envisaged. Likewise any number, orientation and spacing of heat rods 13 may be used as required.

Likewise, the water carrying tubes 20, and the heat exchange coils 17, 19 are exemplary only, and other configurations for heat transfer within the condenser may be used.

It will be appreciated that the heat rods may comprise substantially solid metal rods, whereby heat is conducted by way of their thermal conductivity.

The invention claimed is:

1. A combustion boiler preheater comprising:
    a flue box comprising:
        a combustion gas inlet that receives hot combustion gas from a boiler; and
        a combustion air inlet that receives air for combustion in said boiler;
    a condenser comprising:
        a mains cold water inlet;
        a mains water outlet, wherein said mains cold water inlet and said mains water outlet are arranged such that mains water flows through said condenser prior to being supplied to a boiler combustion chamber;
        a central heating water return;
        a central heating water flow outlet, wherein said central heating water return and said central heating water flow outlet are arranged such that central heating water flows through said condenser prior to being supplied to said boiler combustion chamber; and
        a plurality of connections that enable said condenser to be connected to preheated fluid supply pipework from a source of preheated fluid, wherein said preheated fluid comprises fluid heated by heat from any of combustion gas or a renewable energy source;
    a combustion gas heat exchanger operative to transfer heat from the combustion gas flowing through the combustion gas inlet to the combustion air flowing through the combustion air inlet such that the combustion air is preheated prior to entering the boiler,
    wherein said condenser transfers heat from said preheated fluid to at least one of mains cold water from said mains cold water inlet, or central heating water from said central heating water return in order to preheat the mains or central heating water prior to entering said boiler combustion chamber, wherein the combustion gas heat exchanger comprises at least one heat rod filled with a fluid, wherein heat is transferred from the combustion gas into the fluid to vaporize the fluid, and wherein heat is transferred from the vaporized fluid to the inlet combustion air by subsequently condensing the fluid.

2. The combustion boiler preheater as claimed in claim 1, wherein said combustion gas heat exchanger is operative to heat the preheated fluid prior to the preheated fluid entering the condenser.

3. The combustion boiler preheater as claimed in claim 1, wherein the combustion gas heat exchanger comprises any of (i) part of the flue box, and (ii) part of a separate flue pipe.

4. The combustion boiler preheater as claimed in claim 3, wherein the combustion gas heat exchanger is provided in the separate flue pipe.

5. The combustion boiler preheater as claimed in claim 3, further comprising an array of heat rods spaced along a longitudinal axis of the flue pipe.

6. The combustion boiler preheater as claimed in claim 1, wherein the combustion gas heat exchanger is provided at the flue box.

7. The combustion boiler preheater as claimed in claim 1, further comprising an array of parallel heat rods.

8. The combustion boiler preheater as claimed in claim 1, wherein the condenser comprises an array of tubes some of which are connected between the mains cold water inlet and the mains water outlet so that mains water passes along the tubes, and some of which are connected between the central heating water return and the central heating water flow outlet so that central heating water passes along the tubes, and wherein the condenser further comprises a heat exchange coil arranged with the tubes to transfer heat from the preheated fluid to the water in the tubes.

9. The combustion boiler preheater as claimed in claim 1, wherein the renewable energy source is arranged to directly heat the preheated fluid.

10. The combustion boiler preheater as claimed in claim 1, wherein the renewable energy source is arranged to indirectly heat the preheated fluid.

11. The combustion boiler preheater as claimed in claim 1, wherein the combustion gas heat exchanger comprises at least one heat rod comprising a substantially solid metal rod.

* * * * *